US010157168B2

(12) United States Patent
Nicholas et al.

(10) Patent No.: US 10,157,168 B2
(45) Date of Patent: Dec. 18, 2018

(54) SYSTEMS AND METHODS FOR ASYMMETRICAL FORMATTING OF WORD SPACES ACCORDING TO THE UNCERTAINTY BETWEEN WORDS

(71) Applicant: Asymmetrica Labs Inc., San Francisco, CA (US)

(72) Inventors: Christopher D Nicholas, San Mateo, CA (US); Kenneth R Brownfield, Novato, CA (US)

(73) Assignee: Asymmetrica Labs Inc., San Francisco, CA (US)

( * ) Notice: Subject to any disclaimer, the term of this patent is extended or adjusted under 35 U.S.C. 154(b) by 0 days.

(21) Appl. No.: 15/063,794

(22) Filed: Mar. 8, 2016

(65) Prior Publication Data

US 2017/0185566 A1   Jun. 29, 2017

Related U.S. Application Data

(60) Provisional application No. 62/131,187, filed on Mar. 10, 2015.

(51) Int. Cl.
| | | |
|---|---|---|
| *G06F 17/21* | (2006.01) | |
| *G06F 17/22* | (2006.01) | |
| *G06F 17/27* | (2006.01) | |

(52) U.S. Cl.
CPC .......... *G06F 17/211* (2013.01); *G06F 17/217* (2013.01); *G06F 17/218* (2013.01); *G06F 17/2247* (2013.01); *G06F 17/2294* (2013.01); *G06F 17/271* (2013.01); *G06F 17/2705* (2013.01); *G06F 17/277* (2013.01)

(58) Field of Classification Search
CPC .... G06F 17/211; G06F 17/212; G06F 17/217; G06F 17/2247; G06F 17/218; G06F 17/2294; G06F 17/271

USPC ......................................................... 715/244
See application file for complete search history.

(56) References Cited

U.S. PATENT DOCUMENTS

| | | | | |
|---|---|---|---|---|
| 5,146,405 A | * | 9/1992 | Church | G06F 17/271 |
| | | | | 700/90 |
| 5,801,679 A | * | 9/1998 | McCain | G06F 3/04842 |
| | | | | 715/723 |
| 5,857,212 A | * | 1/1999 | Van De Vanter | G06F 8/33 |
| | | | | 715/234 |

(Continued)

OTHER PUBLICATIONS

"Computation of Conditional Probability Statistics by 8-Month-Old Infants"; Richard N. Aslin et al.; Psychological Science Research Report; vol. 9, No. 4, Jul. 1998; pp. 321-324.
"The Search for Sim Plicity: A Fundam ental Cognitive Principle?"; Nick Chater; The Quarterly Journal of Experimental Psychology, 1999, 52A (2); pp. 273-302.

(Continued)

*Primary Examiner* — Scott T Baderman
*Assistant Examiner* — Hassan Mrabi
(74) *Attorney, Agent, or Firm* — Staniford Tomita LLP

(57) ABSTRACT

Asymmetrical formatting of word spaces according to the uncertainty between words includes an initial filtering process and subsequent text formatting process. An equivocation filter generates a mapping of keys and values (output) from a corpus or word sequence frequency data (input). Text formatting process for asymmetrically adjusts the width of spaces adjacent to keys using the values. The filtering process, which generates a mapping of keys and values can be performed once to analyze a corpus and once generated, the key-value mapping can be used multiple times by a subsequent text processing process.

22 Claims, 23 Drawing Sheets

(56) References Cited

U.S. PATENT DOCUMENTS

| | | |
|---|---|---|
| 7,069,508 B1 | 6/2006 | Bever et al. |
| 7,346,489 B1 | 3/2008 | Bever et al. |
| 7,743,324 B1 | 6/2010 | Bever et al. |
| 8,209,601 B2 | 6/2012 | Bever et al. |
| 8,306,356 B1 | 11/2012 | Bever et al. |
| 8,755,629 B2 | 6/2014 | Bever et al. |
| 8,819,541 B2 | 8/2014 | Nicholas et al. |
| 8,959,427 B1* | 2/2015 | Carlsson ............. G06F 17/3089 715/236 |
| 9,026,907 B2 | 5/2015 | Lum |
| 2005/0071495 A1* | 3/2005 | Kadota ................ G03G 15/55 709/232 |
| 2009/0100154 A1* | 4/2009 | Stevenson ............ G06Q 30/02 709/220 |
| 2010/0042914 A1* | 2/2010 | Horiuchi ............. G06F 17/218 715/235 |
| 2011/0202832 A1 | 8/2011 | Lum |
| 2013/0047078 A1* | 2/2013 | Bever .................. G06K 9/723 715/245 |

OTHER PUBLICATIONS

"Infant artificial language learning and language acquisition"; Rebecca L. Gomez et al.; Review, Trends in Cognitive Sciences—vol. 4, No. 5, May 2000; pp. 1-9.

"Simple, applied text parsing"; Michael M. Granaas; Behavior Research Methods, Instruments, & Computers, 1985, 17(2); pp. 209-216.

"Fuzziness vs. Probability"; Bart Kosko; Int. J. General Systems, vol. 17, 1990; pp. 211-240.

"Syntactic Annotations for the Google Books Ngram Corpus"; Yuri Lin et al.; Proceedings of the 50th Annual Meeting of the Association for Computational Linguistics; pp. 169-174.

"From shared contexts to syntactic categories: The role of distributional information in learning linguistic form-classes" Patricia A. Reeder et al.; Cognitive Psychology 66 (2013); pp. 30-54.

"Word Predictability After Hesitations: A Corpus-Based Study"; Elizabeth Shriberg et al.; Speech Technology and Research Laboratory SRI International; pp. 1-4.

"Statistical Learning of Syntax: The Role of Transitional Probability"; Susan P. Thompson et al., Language Learning and Development, 3(1); pp. 1-42.

* cited by examiner

| w1 | w2 | frequency(w1, w2) |
|---|---|---|
| , | and | 2,278 |
| , | the | 1,419 |
| , | but | 864 |
| | ... | |
| . | the | 1,380 |
| . | i | 932 |
| . | he | 664 |
| | ... | |
| the | first | 234 |
| the | same | 218 |
| the | world | 169 |
| | ... | |
| and | the | 738 |
| and | i | 344 |
| and | a | 253 |
| | ... | |
| of | the | 2,586 |
| of | a | 445 |
| of | his | 191 |
| | ... | |
| to | the | 1,055 |
| to | be | 657 |
| to | a | 246 |
| | ... | |
| a | lot | 199 |
| a | few | 143 |
| a | little | 140 |
| | ... | |
| in | the | 2,043 |
| in | a | 544 |
| in | this | 166 |
| | ... | |
| that | the | 399 |
| that | he | 161 |
| that | is | 144 |
| | ... | |
| is | a | 364 |
| is | the | 275 |
| is | not | 159 |
| | ... | |

220

| w | frequency(w) |
|---|---|
| , | 27,101 |
| . | 23,912 |
| the | 23,684 |
| and | 11,667 |
| of | 11,291 |
| to | 11,049 |
| a | 9,855 |
| in | 7,894 |
| that | 5,192 |
| is | 3,906 |
| ... | |

| w1 | w2 | frequency(w1, w2) |
|---|---|---|
| de | la | 1,125 |
| de | los | 422 |
| de | las | 243 |
| ... | | |
| la | ciudad | 91 |
| la | que | 45 |
| la | primera | 48 |
| ... | | |
| el | año | 179 |
| el | nombre | 46 |
| el | primer | 41 |
| ... | | |
| a | la | 309 |
| a | los | 128 |
| a | su | 74 |
| ... | | |
| que | se | 173 |
| que | el | 82 |
| que | la | 72 |
| ... | | |
| los | años | 42 |
| los | que | 30 |
| los | estados | 28 |
| ... | | |
| las | que | 16 |
| las | fuerzas | 12 |
| las | elecciones | 10 |
| ... | | |
| una | de | 41 |
| una | población | 22 |
| una | gran | 16 |
| ... | | |
| su | nombre | 18 |
| su | padre | 16 |
| su | primer | 15 |
| ... | | |

220

| w | frequency(w) |
|---|---|
| de | 7,799 |
| la | 3,899 |
| el | 2,862 |
| a | 1,752 |
| que | 1,679 |
| los | 1,403 |
| las | 856 |
| una | 833 |
| su | 771 |
| ... | |

| w1 | w2 | frequency(w1, w2) |
|---|---|---|
| the | • | 21,258 |
| , | • | 9,496 |
| • | of | 9,013 |
| a | • | 8,696 |
| • | to | 7,795 |
| to | • | 7,218 |
| • | and | 7,175 |
| and | • | 6,968 |
| of | • | 5,859 |
| • | in | 5,442 |
| . | • | 5,249 |
| • | the | 4,397 |
| • | that | 3,316 |
| in | • | 3,102 |
| • | for | 2,660 |
| of | the | 2,567 |
| • | a | 2,473 |
| ... | | |
| [total] | | 340,038 |

230 / 240

| w | frequency(w) |
|---|---|
| • | 210,154 |
| , | 27,101 |
| . | 23,912 |
| the | 23,684 |
| and | 11,667 |
| of | 11,291 |
| to | 11,049 |
| a | 9,855 |
| in | 7,894 |
| that | 5,192 |
| is | 3,906 |
| ... | |
| [total] | 484,767 |

| w1 | w2 | frequency(w1, w2) |
|---|---|---|
| • | de | 7,050 |
| de | • | 4,966 |
| la | • | 3,803 |
| el | • | 2,613 |
| • | el | 2,081 |
| • | la | 1,862 |
| • | a | 1,510 |
| los | • | 1,311 |
| que | • | 1,262 |
| • | que | 1,215 |
| de | la | 1,125 |
| • | # | 1,019 |
| # | • | 976 |
| a | • | 938 |
| las | • | 817 |
| una | • | 786 |
| su | • | 767 |
| • | los | 591 |
| • | una | 509 |
| ... | | |
| [total] | | 44,756 |

230 (w1, w2 table) | 240

| w | frequency(w) |
|---|---|
| • | 74,892 |
| de | 7,799 |
| la | 3,899 |
| el | 2,862 |
| # | 2,500 |
| a | 1,752 |
| que | 1,679 |
| los | 1,403 |
| las | 856 |
| una | 833 |
| su | 771 |
| ... | |
| [total] | 102,548 |

FIG. 6

| key1 | key2 | equivocation score | post-normalization | adjustment values |
|---|---|---|---|---|
| • | of | 0.074 | 119.704 | 0.83 — 550 |
| • | to | 0.067 | 108.896 | 0.75 |
| • | and | 0.064 | 103.059 | 0.71 |
| • | in | 0.053 | 85.305 | 0.59 |
| • | the | 0.045 | 73.379 | 0.51 |
| • | that | 0.037 | 59.767 | 0.41 |
| • | for | 0.031 | 50.726 | 0.35 |
| • | a | 0.030 | 48.009 | 0.33 |
| • | is | 0.027 | 44.374 | 0.31 |
| • | on | 0.027 | 44.202 | 0.31 |
| • | with | 0.026 | 42.255 | 0.29 |
| • | at | 0.020 | 31.833 | 0.22 |
| , | • | 0.019 | 31.287 | 0.22 |
| • | was | 0.019 | 29.864 | 0.21 |
| • | from | 0.018 | 29.649 | 0.20 |
| . | • | 0.018 | 28.943 | 0.20 |
| ... | | | | |
| of | the | 0.009 | 13.701 | 0.09 |
| ... | | | | |
| his | • | -0.001 | -2.084 | -0.01 |
| an | • | -0.001 | -2.160 | -0.01 |
| a | • | -0.006 | -9.536 | -0.07 |
| the | • | -0.015 | -24.964 | -0.17 — 555 |

FIG. 7

| key1 | key2 | equivocation score | post-normalization | adjustment values |
|------|------|-------------------:|-------------------:|------------------:|
| • | de | 0.242 | 797,426 | 0.71 |
| • | el | 0.112 | 354,354 | 0.31 |
| • | la | 0.101 | 316,015 | 0.28 |
| • | a | 0.082 | 257,971 | 0.23 |
| • | que | 0.059 | 196,453 | 0.17 |
| • | # | 0.066 | 191,171 | 0.17 |
| • | es | 0.058 | 124,976 | 0.11 |
| • | los | 0.035 | 99,818 | 0.09 |
| • | una | 0.034 | 92,986 | 0.08 |
| • | su | 0.029 | 80,169 | 0.07 |
| • | las | 0.026 | 69,683 | 0.06 |
| ... | | | | |
| de | la | 0.015 | 5,302 | 0.00 |
| ... | | | | |
| a | • | -0.010 | -86,860 | -0.08 |
| las | • | -0.013 | -105,564 | -0.09 |
| su | • | -0.013 | -108,799 | -0.10 |
| que | • | -0.015 | -121,433 | -0.11 |
| una | • | -0.020 | -127,057 | -0.11 |
| los | • | -0.019 | -137,178 | -0.12 |
| el | • | -0.045 | -237,654 | -0.21 |
| de | • | -0.082 | -297,419 | -0.26 |
| la | • | -0.071 | -332,114 | -0.29 |

```html
<html>
<head>
<title>The Adventures of Tom Sawyer (excerpt)</title>
<style type="text/css">
        p { text-indent: 2em; }
</style>
</head>
<body>
<H2>PREFACE</H2>
<p style="text-indent: 2em;">
Most of the adventures recorded in this book really occurred; one or two were experiences of my own,
the rest those of boys who were schoolmates of mine. Huck Finn is drawn from life; Tom Sawyer also,
but not from an individual -- he is a combination of the characteristics of three boys whom I knew, and
therefore belongs to the composite order of architecture.
</p>
<p>
The odd superstitions touched upon were all prevalent among children and slaves in the West at the
period of this story -- that is to say, thirty or forty years ago.
</p>
<p>
Although my book is intended mainly for the entertainment of boys and girls, I hope it will not be
shunned by men and women on that account, for part of my plan has been to try to pleasantly remind
adults of what they once were themselves, and of how they felt and thought and talked, and what
queer enterprises they sometimes engaged in.
</p>
<a href="http://www.cmgww.com/historic/twain/">THE AUTHOR</a>.<br>
HARTFORD, 1876.<br>
</body>
</html>
```

FIG. 10

```
                    ┌─ 150
<html>
<head>
<title>The Adventures of Tom Sawyer (excerpt)</title>
<style type="text/css">
        p { text-indent: 2em; }
</style>

<!-- All tags and adjustments Copyright 2014 Asymmetrica Labs Inc. -->
<style type="text/css">
        span.asym0 { letter-spacing: -0.002em; }
        span.asym1 { letter-spacing: 0.004em; }
        span.asym2 { letter-spacing: -0.058em; }
        span.asym3 { letter-spacing: 0.14em; }
        span.asym4 { letter-spacing: -0.014em; }
        span.asym5 { letter-spacing: -0.008em; }
        span.asym6 { letter-spacing: 0.192em; }
        span.asym7 { letter-spacing: 0.008em; }
        span.asym8 { letter-spacing: 0.002em; }
        span.asym9 { letter-spacing: -0.004em; }
        span.asym10 { letter-spacing: 0.018em; }
        span.asym11 { letter-spacing: 0.082em; }
        span.asym12 { letter-spacing: 0.038em; }
        span.asym13 { letter-spacing: -0.01em; }
        span.asym14 { letter-spacing: 0.006em; }
        span.asym15 { letter-spacing: -0.018em; }
        span.asym16 { letter-spacing: -0.034em; }
        span.asym17 { letter-spacing: 0.012em; }
        span.asym18 { letter-spacing: -0.012em; }
        span.asym19 { letter-spacing: 0.186em; }
        span.asym20 { letter-spacing: 0.04em; }
        span.asym21 { letter-spacing: 0.084em; }
        span.asym22 { letter-spacing: 0.068em; }
        span.asym23 { letter-spacing: 0.022em; }
        span.asym24 { letter-spacing: -0.006em; }
        span.asym25 { letter-spacing: 0.01em; }
</style>
</head>
```

```
<body>
<H2>PREFACE</H2>
<p style="text-indent: 2em;">
Most<span class="asym0"> </span>of<span class="asym1"> </span>the<span class="asym2"> </
span>adventures recorded<span class="asym3"> </span>in<span class="asym0"> </span>this<span
class="asym4"> </span>book really occurred; one or two were<span class="asym5"> </
span>experiences<span class="asym6"> </span>of my own,<span class="asym7"> </span>the<span
class="asym2"> </span>rest<span class="asym8"> </span>those of<span class="asym9"> </
span>boys<span class="asym10"> </span>who were<span class="asym5"> </span>schoolmates<span
class="asym6"> </span>of mine.<span class="asym7"> </span>Huck Finn<span class="asym11"> </
span>is<span class="asym5"> </span>drawn<span class="asym12"> </span>from<span class="asym13">
</span>life;<span class="asym9"> </span>Tom Sawyer<span class="asym1"> </span>also,<span
class="asym14"> </span>but not from an<span class="asym15"> </span>individual -- he<span
class="asym0"> </span>is<span class="asym0"> </span>a<span class="asym16"> </
span>combination<span class="asym6"> </span>of<span class="asym1"> </span>the<span
class="asym2"> </span>characteristics<span class="asym6"> </span>of three<span class="asym9"> </
span>boys whom I<span class="asym0"> </span>knew,<span class="asym17"> </span>and<span
class="asym18"> </span>therefore belongs<span class="asym6"> </span>to<span class="asym8"> </
span>the<span class="asym2"> </span>composite order of<span class="asym9"> </span>architecture.
</p>
<p>
The<span class="asym2"> </span>odd superstitions touched<span class="asym8"> </span>upon were
all<span class="asym5"> </span>prevalent<span class="asym8"> </span>among<span class="asym0"> </
span>children<span class="asym19"> </span>and<span class="asym18"> </span>slaves<span
class="asym3"> </span>in<span class="asym0"> </span>the<span class="asym2"> </span>West<span
class="asym20"> </span>at<span class="asym5"> </span>the<span class="asym2"> </span>period<span
class="asym6"> </span>of this<span class="asym4"> </span>story -- that<span class="asym0"> </
span>is<span class="asym0"> </span>to<span class="asym4"> </span>say, thirty or forty years<span
class="asym8"> </span>ago.
</p>
<p>
Although my<span class="asym5"> </span>book<span class="asym11"> </span>is<span class="asym5">
</span>intended mainly<span class="asym21"> </span>for<span class="asym9"> </span>the<span
class="asym2"> </span>entertainment<span class="asym6"> </span>of<span class="asym9"> </
span>boys<span class="asym19"> </span>and<span class="asym18"> </span>girls, I<span
class="asym0"> </span>hope<span class="asym12"> </span>it<span class="asym0"> </span>will<span
class="asym0"> </span>not<span class="asym0"> </span>be<span class="asym4"> </
span>shunned<span class="asym20"> </span>by<span class="asym13"> </span>men<span
class="asym19"> </span>and<span class="asym18"> </span>women<span class="asym22"> </span>on
that account, for<span class="asym13"> </span>part<span class="asym6"> </span>of my<span
class="asym5"> </span>plan<span class="asym23"> </span>has<span class="asym9"> </span>been
to<span class="asym4"> </span>try<span class="asym6"> </span>to<span class="asym4"> </
span>pleasantly remind adults<span class="asym6"> </span>of what<span class="asym0"> </span>they
once were themselves,<span class="asym17"> </span>and of how they<span class="asym24"> </
span>felt<span class="asym19"> </span>and<span class="asym18"> </span>thought<span
class="asym19"> </span>and<span class="asym18"> </span>talked,<span class="asym17"> </span>and
what<span class="asym9"> </span>queer enterprises<span class="asym25"> </span>they<span
class="asym24"> </span>sometimes engaged<span class="asym3"> </span>in.
</p>THE<span class="asym2"> </span>AUTHOR.<br>
HARTFORD,<span class="asym8"> </span>1876.<br>
</body>
</html>
```

PREFACE

Most of the adventures recorded in this book really occurred; one or two were experiences of my own, the rest those of boys who were schoolmates of mine. Huck Finn is drawn from life; Tom Sawyer also, but not from an individual -- he is a combination of the characteristics of three boys whom I knew, and therefore belongs to the composite order of architecture.

The odd superstitions touched upon were all prevalent among children and slaves in the West at the period of this story -- that is to say, thirty or forty years ago.

Although my book is intended mainly for the entertainment of boys and girls, I hope it will not be shunned by men and women on that account, for part of my plan has been to try to pleasantly remind adults of what they once were themselves, and of how they felt and thought and talked, and what queer enterprises they sometimes engaged in.

THE AUTHOR.
HARTFORD, 1876.

FIG. 15

SYSTEMS AND METHODS FOR ASYMMETRICAL FORMATTING OF WORD SPACES ACCORDING TO THE UNCERTAINTY BETWEEN WORDS

CROSS REFERENCE TO RELATED APPLICATIONS

This application claims priority to U.S. Provisional Patent Application No. 62/131,187, "Systems And Methods For Asymmetrical Formatting Of Word Spaces According To The Uncertainty Between Words" filed Mar. 10, 2015 which is incorporated by reference in its entirety.

TECHNICAL FIELD

The invention relates to asymmetrically formatting the width of between-word spaces in text presentation according to the uncertainty between words to improve the reading experience.

BACKGROUND

Phrase-formatting is a typographic technique to improve the reading experience in which the phrases in a sentence are emphasized, often by making the word spaces larger between phrases and smaller within a phrase. This asymmetric word space sizing provides visual cues in the text to aid the reader with chunking the units of meaning. Manual, semi-automated, and automated use of this technique has been demonstrated to improve reading comprehension, speed and enjoyment.

One system and method of phrase-formatting (Bever and Robbart, 2006) uses an artificial neural network with a three layer connectionist model: an input layer, a "hidden" layer, and a output layer. This artificial neural network trains on text input data, extracts patterns such as the likelihood of a phrase break, and builds a file of weights and connections for the units of the model stored in a library. The artificial neural network uses a library of punctuation and function words as starting data and analyzes text from a parser by examining a sliding window of three word sequences across the text input.

During this training analysis it learns to classify the likelihood that the second word of the three word sequence is at the end of a sentence. If it finds punctuation or an article or function word, it takes note of the first and third word and adds information to the data models in the library. Otherwise, it examines the stored data model. Next, based on the outcome of the examination of the three word sequence, the neural network assigns likelihood values that the word is the beginning or end of a phrase to the spaces between the words.

Once trained on a corpus of text, the neural network can be used to format text. After inputting the text to be formatted, the neural network is run to determine "C" values ranging from 0-3, with "3" indicating end of phrase punctuation, "2" indicating a major phrase break, "1" indicating a minor phrase break, and "0" assigned to all other breaks. Once these phrase boundaries have been established, text margins are formatted line by line in reverse line order. Next, the available space in each line is determined, then using the phrase boundary values and the available space, relative space values are assigned.

Another system and method (Bever et al., 2012), computes the informativeness of extra-lexical information (such as punctuation and spaces) adjacent to lexical items (words) to adjust character prominence. In this method, the informativeness of a space at the beginning or end of a word is proportional to the frequency of a space character relative to the frequency of non-space punctuation characters. Bever et al. (2012) also describe a second method, in which informativeness of punctuation is calculated using the predictability of punctuation after the lexical unit and the predictability of punctuation before the next lexical unit.

It would be desirable to have systems and methods for asymmetrically formatting the width of between-word spaces without: (1) determining likelihood that a word is the beginning or end of a phrase, (2) using an artificial neural network, or (3) using punctuation to determine the end of a phrase or to compute informativeness.

REFERENCES

Aslin, R. N., Saffran, J. R., & Newport, E. L. (1998). Computation of conditional probability statistics by 8-month-old infants. *Psychological science* 9 (4), 321-324 Granaas, Michael. Simple, applied text parsing, 209-216. Vol. 17. Behavior Research Methods, Instruments, and Computers, 1985.

Chater, N. (1999). The search for Simplicity: A fundamental cognitive principle? *The Quarterly Journal of Experimental Psychology*, 52A(2), 273-302.

Gómez, R. L., & Gerken, L. A. (2000). Infant artificial language learning and language acquisition. *Trends in Cognitive Sciences* (4), 178-186. PMID: 10782103.

Granaas, M. M. (1985). Simple, applied text parsing. *Behavior Research Methods, Instruments, & Computers*, 17(2), 209-216.

Kosko, B. (1990). Fuzziness vs. Probability. *International Journal of General Systems*, vol. 17, no. 1, pp. 211-240.

Lin, Y., Michel, J-B., Aiden, E. L., Orwant, J., Brockmanm W. & Petrov, S. (2012). Syntactic Annotations for the Google Books Ngram Corpus. Proceedings of the 50th Annual Meeting of the Association for Computational Linguistics, 169-174.

Reeder, P. A., Newport, E. L., & Aslin, R. N. (2013). From shared contexts to syntactic categories: The role of distributional information in learning linguistic form-classes. *Cognitive Psychology*, 66, 30-54.

Shriberg, E. E. & Stolcke, A. (1996). Word predictability after hesitations: a corpus-based study. in Proceedings of the 4th international conference on spoken language processing. Philadelphia, Pennsylvania, USA, 1868-1871.

Thompson, S. P., & Newport, E. L. (2007). Statistical learning of syntax: The role of transitional probability. *Language Learning and Development*, 3(1), 1-42.

SUMMARY OF THE INVENTION

One embodiment includes an initial filtering process and subsequent text formatting process. An embodiment of the first process includes an equivocation filter to generate a mapping of keys and values (output) from a corpus or word sequence frequency data (input). An embodiment of the second process includes a text formatting process for asymmetrically adjusting the width of spaces adjacent to keys using the values. The filtering process, which generates a mapping of keys and values, need only be performed once to analyze a corpus; however, once generated, the key-value mapping can be used multiple times by a subsequent text processing process.

In an embodiment, a filtering process includes statistical modeling of a language, including measurement of the uncertainty across word spaces using principles from perceptual span asymmetry, strategically indeterminate input data, and information theory. In an embodiment, the input to the filter consists of derivatives such as word sequence frequency counts (n-grams). In another embodiment, the input to the filter is a raw corpus from which word sequence frequency counts (n-grams) can be generated. In an embodiment, the filtering process includes an asymmetric property of reading, in which properties of the word after the space may depend on properties of the word before the space. The subsequent word may be partially predictable based on the context of (1) the known word and (2) incomplete, but still useful parafoveal information about the following word. In an embodiment, the filtering process includes partial conflation of lexical frequency input to consist of strategically indeterminate pseudo-syntactic information about function word and content-word transitions. Partial conflation is achieved by having lexical items which carry syntactic information (function words) retain their identity, while having lexical items which lack syntactic information (content words) have their identity replaced (conflated) with one or more wildcards ("•"). In an embodiment, the filtering process includes computation of conditional entropy—also called equivocation and written as H(y|x)—across a word space to quantify the informational asymmetry between words. This is a measure of the amount of variability in a second, unknown word or wildcard (y), given the variability of a first, known word or wildcard (x). In an embodiment, a wildcard is the part of speech category of a word. In an embodiment, a wildcard is the open-class status (i.e., is a content word) of the word. In an embodiment, the output of the filter is a mapping of keys and values for two or more lexical item hybrid sequences in a language (e.g., "[•, of] 0.83", "[of, the] 0.09", "[the, •] −0.17", etc.).

In an embodiment, a text formatting process asymmetrically adjusts the width of spaces adjacent to keys using values from an equivocation filter mapping of keys and values. In an embodiment, for each text data block, the process scans the data for a space followed by a space-terminated word token ("ink"). Once found, the previously parsed token followed by the current token are marked as Token A and Token B, respectively. In an embodiment, each token is examined for leading and/or trailing punctuation to create Core A and Core B tokens, which are replaced with pseudo-syntactic wildcards using partial conflation. In an embodiment, these pseudo-syntactic Core tokens are optionally concatenated with trailing punctuation, if any, to generate Key A and Key B. In other embodiments, Core tokens are used to generate Keys directly. In another embodiment, Keys are generated from Core tokens in combination with trailing (Key A) and/or leading (Key B) punctuation adjacent to the space. In an embodiment, the process looks up an adjustment value from the recorded output of equivocation filter process using one or more keys. In one embodiment, the key is derived from a key pair (Key A, Key B). In an alternative embodiment, the key consists of compounded segments of lexical information, such as: one or more of punctuation, wildcards, sub-classed wildcards, part of speech, or function words. In a further embodiment, the key consists of either multiple keys or a single key represented as a concatenated string, tuple, dictionary, or analogous data structure. In an embodiment, the process applies a proportional adjustment to the space between Token A and Token B, wherein the proportional change in space width is identical to the adjustment value.

BRIEF DESCRIPTION OF THE FIGURES

FIG. 3 is a diagram depicting the input to an equivocation filter with selected examples of word and punctuation sequence data (bigrams and unigrams and their respective frequency counts) for English;

FIG. 4 is a diagram depicting the input to an equivocation filter with selected examples of word sequence data (bigrams and unigrams and their respective frequency counts) for Spanish;

FIG. 5 is a diagram depicting an intermediate step in an equivocation filter with selected examples of word sequence data after partial conflation into a hybrid (• indicates a wildcard; i.e., any content word) for English;

FIG. 6 is a diagram depicting an intermediate step in an equivocation filter with selected examples of word sequence data after partial conflation into a hybrid (• indicates a wildcard; i.e., any content word) and a function pseudo-category (# indicates a pseudo-wildcard; i.e, any Arabic numeral) for Spanish;

FIG. 7 is a diagram depicting selected English examples of output from an equivocation filter, a mapping of keys and values with three illustrative examples of values: raw equivocation scores, equivocation scores after normalization, and normalized equivocation scores after aesthetic rescaling (using a scaling factor of range=1) to generate relative adjustment values;

FIG. 8 is a diagram depicting selected Spanish examples of output from an equivocation filter, a mapping of keys and values with three illustrative examples of values: raw equivocation scores, equivocation scores after normalization, and normalized equivocation scores after aesthetic rescaling (using a scaling factor of range=1) to generate relative adjustment values;

FIG. 10 is a diagram depicting an HTML document before application of a text formatting process;

FIG. 11 is a diagram depicting the head of an HTML document after application of a text formatting process and illustrating asymmetrical word spacing implemented as CSS span tags;

FIG. 12 is a diagram depicting the body of an HTML document after application of a text formatting process and illustrating asymmetrical word spacing implemented as CSS span tags;

FIG. 15 is a diagram depicting a web browser rendering an English HTML document after application of a text formatting process highlighting the expanded spaces between a wildcard and the word "of";

DETAILED DESCRIPTION

Computer-implemented systems and methods are disclosed for asymmetrically formatting the width of between-word spaces in text presentation according to the uncertainty between words to improve the reading experience.

Figure 1:
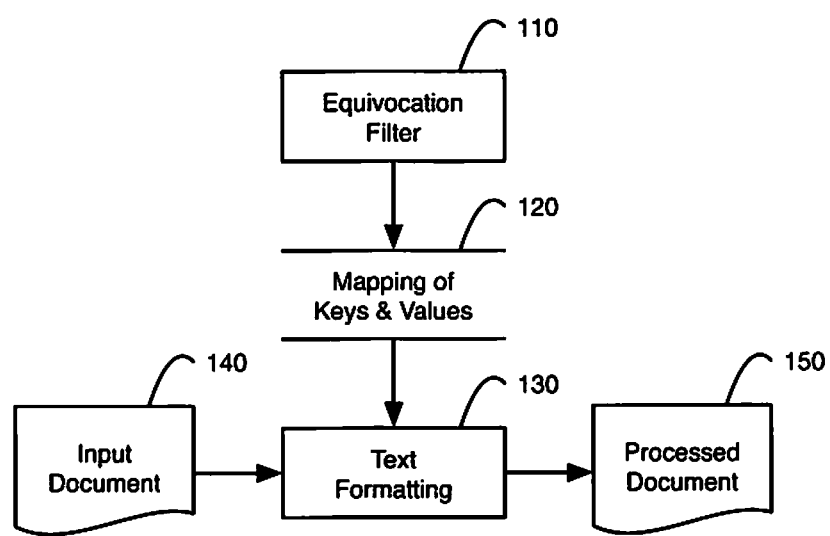
FIG. 1 is a flow chart illustrating an example method for asymmetrical formatting of word spaces according to the uncertainty between words using data from an equivocation filter and a text formatting process.

Asymmetrically adjusting word space widths first requires a filtering process to analyze the pseudo-syntactic structure of a language, and a second text formatting process to apply the results of such an analysis to a given document containing text. As depicted in FIG. 1, the filtering process uses an equivocation filter 110 to generate a mapping of keys and values 120 (output) from at least one corpus or word sequence frequency data (input). The text formatting process 130 asymmetrically adjusts the width of spaces adjacent to keys using the values. The text formatting process receives an input document 140 and applies the text formatting process 130 to generate a processed document 150 as output.

The filtering process operates given a database of function words, closed-class words that have primarily a syntactic rather than a semantic role. The database includes words or word sequences from one or more lexical categories: auxiliary verbs, determiners, conjunctions, prepositions, and pronouns word classes; and optionally of function word categories, such as Arabic numerals, Roman numerals, or proper names; or an optional list of punctuation characters, for example, in English:

. ? ! , ; : ( ) etc.

The filtering process includes statistical modeling of a language, including measurement of the uncertainty across word spaces using principles from perceptual span asymmetry, strategically indeterminate input data, and information theory.

The perceptual span in which readers obtain useful information about words is limited in size and is asymmetric in length: about 3-4 characters behind fixation and about 14-15 characters ahead of fixation. Perceptual span is affected by the reading direction of the writing script and is due to attentional rather than visual acuity factors. Reading is intrinsically asymmetric because the word being fixated on is known, while the subsequent word is not yet known; however, it may be partially predictable based on the context of the known word and incomplete but still useful parafoveal information about the following word.

Figure 2:
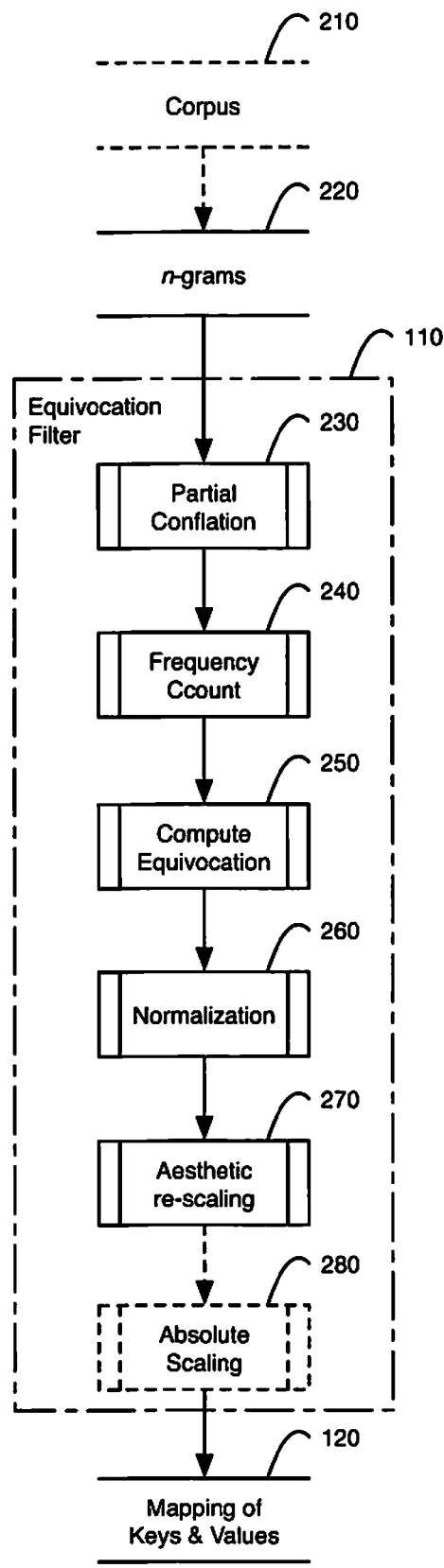
FIG. 2 is a flow chart illustrating an example method for generating a mapping of keys and values with an equivocation filter process.

With reference to FIG. 2, an embodiment of a flowchart is illustrated for a method of generating a mapping of keys and values with an equivocation filter process. The raw input to the filter is either a derivative such as n-gram frequency counts 220 or an optional corpus 210 from which these can be generated. First, this input is made strategically uncertain by re-categorizing raw word sequence frequency data into a hybrid construct using a partial conflation filter 230. In this filtration process, lexical items which carry syntactic information (closed-class or function words) retain their identity; however, lexical items which lack syntactic information (open-class or content words) have their identity replaced (conflation) with one or more wildcards ("•"), which are a category of lexical items. These partial conflation hybrids contain pseudo-syntactic information about transitions between and among function words and content-words (or between and among closed-and open-class words). Critically, this hybridization step requires feature analysis at more than one level of abstraction with some words treated as their lexical identity and some words treated as a category. One example of partial conflation, the words am, are, is, was, were, etc. are treated as a lexeme (root word) "to be" that contains all the inflected word forms. In another example, words such as is, are, did, has, etc. from multiple lexemes such as to be, to do, and to have are treated as a lexical category (word class, or part of speech) "auxiliary verb." In another example, nouns such as time, some verbs such as said, adjectives such as new, and adverbs such as recently can be treated as the category "content words." Next, from these hybrids, frequency counts for unique items and item sequences are generated 240 and used to compute equivocation values 250. Finally, the equivocation values are normalized 260, rescaled to desired relative adjustment values 270, and optionally to absolute adjustment values 280 before output as a mapping of keys and values 120.

From principles of information theory, entropy is a measurement of the amount of uncertainty in predicting random variables. More specifically, the conditional entropy—also called equivocation and written as $H(y|x)$—across a word space is a method for quantifying the informational asymmetry between words. It is a measure of the amount of variability in a second, unknown word (y), given the variability of a first, known word (x). Equivocation is an effective asymmetric measure of how uncertain the word following a space is given knowledge of the word before the space. Equivocation reflects the degree to which an event occurs, a measure of event ambiguity. It is a measure that relates the observation of the known event (x) to the observation of the intersection (x, y) of the second event (y) with the first event (x). Critically, after partial conflation 230, events x and y can be of different types (e.g., lexical identity: x=the, and one or more categories: e.g., y=content word) or of the same type (e.g., x=of, y=the; or x=pronoun, y=auxiliary verb).

There are other conditional probability statistics (e.g., transitional probabilities, mutual information, correlation) that are functionally equivalent to equivocation (conditional entropy). These normalize co-occurrence frequency by the overall frequency of individual events. Any of these conditional probability statistics, including backward transitional probability (the probability of X given Y), provides information for segmentation at transitions.

Use of partial conflation hybrids to measure uncertainty allows the method to robustly handle novel content words with which the model is unfamiliar. Use of partial conflation hybrids also allows equivocation to measure the degree of semantic and syntactic overlap between words and how those words are actually used in a language. This degree of semantic and syntactic overlap is a continuous measure of pseudo-syntactic distance between words. It is a simple one dimensional measure of how semantic (content) words and syntactic (function) words transition into one another in a language.

Equivocation Filter Process

In accordance with one embodiment, for each document in a corpus: first, as shown in FIG. 3 for English and FIG. 4 for Spanish, the document is separated into a list of space-separated tokens, or n-grams 220; second, as shown in FIG. 5 for English and FIG. 6 for Spanish, this token list is iterated through to count the unigram and bigram frequency 240 of pseudo-syntactic hybrids 230; and third, as shown in FIG. 7 for English and FIG. 8 for Spanish, the unigram and bigram frequency counts are used to compute and output the equivocation (conditional entropy) score for each hybrid for each document 250. In an embodiment, equivocation scores for the filtered pseudo-syntactic hybrids can be used directly as values 250 in a key-value mapping 120. In other embodiments, the equivocation scores can be normalized 260 and re-scaled to a desired aesthetic range and then used as values 270. In an embodiment, the output of the filter 110 is a mapping of keys and values 120 for two or more lexical item hybrid sequences in a language (e.g., "[•, of] 0.83", "[of, the] 0.09", "[the, •] −0.17", etc.), a list of the keys 510 and values 520.

In an embodiment of partial conflation 230 and frequency counts of a partial conflation hybrid 240, during iteration through the token list, a two-token window is created at a given position n in the list and Token A is set to position n−1 while Token B is set to position n. Next, any leading and trailing punctuation in Token A is separated from the Core A token. If Core A is in the form of an Arabic or Roman numeral, then it is replaced with a pseudo-wildcard token. Otherwise, if Core A is not in the database of function words, then Core A is replaced with a wildcard token. A lookup key "Key A" is created, which is a concatenation of (in order): any leading punctuation from Token A, Core A, and any trailing punctuation from Token A. Then the unigram counter for Key A is incremented.

Next, any leading and trailing punctuation in Token B is separated from the Core B token. If Core B is in the form of a Arabic or Roman numeral, then it is replaced with a pseudo-wildcard token. Otherwise, if Core B is not in the database of function words, then Core B is replaced with a wildcard token. A lookup key "Key B" is created, which is a concatenation of (in order): any leading punctuation from Token B, Core B, and any trailing punctuation from Token B. Then the bigram counter for (Key A, Key B) is incremented.

Once iteration through the document is complete, the unigram and bigram frequency counts of pseudo-syntactic hybrids are used to compute equivocation scores. In an embodiment, for each recorded bigram (Key A, Key B) and given the recorded unigram frequency of Key A, the recorded bigram (Key A, Key B) frequency, and the total (sum) unigram and bigram frequencies, then equivocation (conditional entropy) scores 250 are computed using:

$$H(y|x) = p(x, y) \times \text{Log}(p(x)/p(x, y)), \text{ where:}$$

$$p(x, y) = \text{bigram\_freq}((\text{Key } A, \text{Key } B))/\text{sum}(\text{bigram\_freq(all)})$$

$$p(x) = \text{unigram\_freq}(\text{Key } A)/\text{sum}(\text{unigram\_freq(all)})$$

In a preferred embodiment, for each document, the equivocation scores are normalized 260 (e.g., converted to standard scores) and then these normalized values for each document are averaged across the corpus (i.e., added and divided by the number of documents). In an alternative embodiment, a multi-document corpus is treated as one single, large document when computing (and normalizing) equivocation scores. In an embodiment, equivocation scores are normalized using standard scores (z-scores) 260, computed using:

$$\text{z-score}(h) = (h - \text{Mean}(h))/\text{Std Dev}(h)$$

where h is each recorded equivocation score, H(y|x). In a further embodiment, normalized equivocation scores are re-scaled to a desired aesthetic range (i.e., the maximum range for word space width to increase and decrease). For example, aesthetic rescaling 270 of normalized equivocation scores is using the following transformation:

$$\text{relative adjustment value} = z \times r/(\text{Max}(z) - \text{Min}(z))$$

where r is a scaling factor describing the range (upper and lower bounds) that adjustment values can vary by (e.g., r=1) and z is a normalized equivocation score.

In an embodiment, relative adjustments 270 are used directly as values, or (optionally) if absolute scaling adjustments are desired they can be converted to absolute percentage values 280:

$$\text{absolute adjustment value} = \text{relative adjustment value} \times 100 + 100$$

In an embodiment, this mapping of each bigram and its either relative or absolute adjustment values are outputted as keys 510 and values 520. In an embodiment, the values 520 have been normalized and rescaled to the desired aesthetic variation 270. These adjustment values 270 specify variable space widths including increased width 550, decreased width 555, or exceptions that retain the original width. In an alternative embodiment, the equivocation (conditional entropy) score 250 or the post-normalized score 260 are used as values in the mapping input and normalization and/or aesthetic rescaling are performed during the text formatting process 130. In this embodiment, aesthetic rescaling can use a predetermined default, or be determined by the user at the time of text formatting. When these values are applied to adjust the formatting between word spaces in a text indicated by the keys 130, the typographic structure of the text is formatted according to the syntactic/non-syntactic uncertainty of the second word given knowledge of the first.

Distribution Methods

Figure 9:
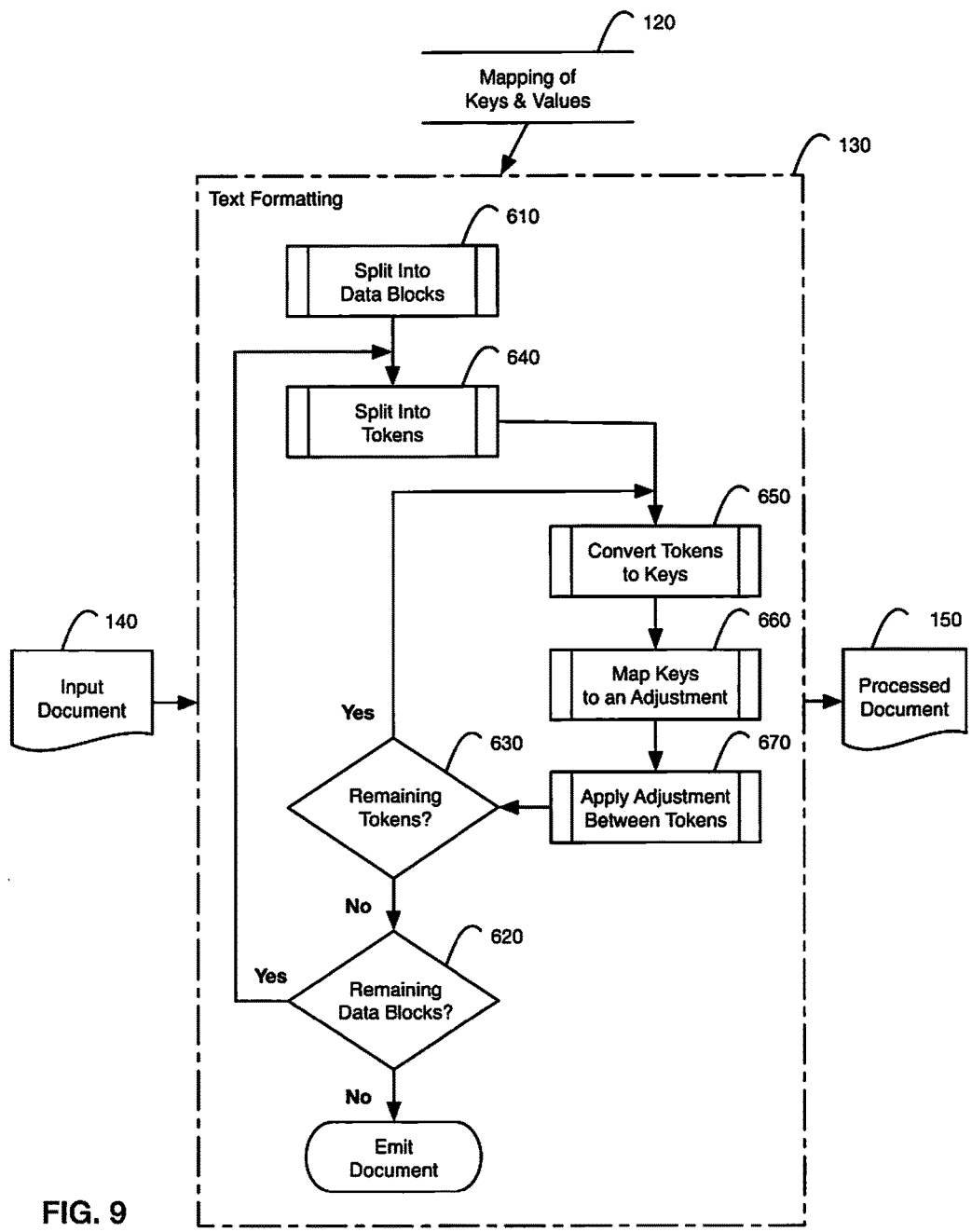
FIG. 9 is a flow chart illustrating an example method for a text formatting process using a data mapping of keys and values from an equivocation filter.

Following is a non-limiting example of an application of the output from the filtering process to asymmetrically adjust the width of spaces in a document. In this example, the document is an HTML document, but the same principles could be adapted to apply to other types of documents containing text. With reference to FIG. 9, an embodiment of a flowchart is illustrated for a method for a text formatting process 130 using a data mapping of keys and values from an equivocation filter 120.

Text Processing

With reference to FIG. 9, for each block of text 140, the block 610 is iteratively scanned for a space followed by a space-terminated word token ("ink"). The previously parsed token (or the first token if at the beginning of a data block) and the currently parsed token are designated Token A and Token B, respectively 640. For each token (A and B), any leading and trailing punctuation (per-token Left Punctuation and Right Punctuation), if they exist, are separated from the Core token.

In an embodiment, if the Core A or Core B tokens are arabic or roman numerals, then Core A and Core B are replaced with corresponding pseudo-wildcards; otherwise keys "Key A" and "Key B" are created that are each a concatenation of (in order): any leading punctuation from Token A or Token B, respectively; Core A or Core B, respectively; and any trailing punctuation from Token A or Token B, respectively 650.

In an embodiment, Key A becomes any trailing punctuation from Core A only, otherwise Key A becomes Core A. In an embodiment, keys contain strings of ink, including a word, followed or proceeded by optional punctuation. In a second embodiment, Key A contains only words and final punctuation of an ink string and Key B contains only words and initial punctuation of an ink string. In a third embodiment, keys contain only words (Core A or Core B).

Next, the adjustment value recorded as output from the equivocation filter is looked up using the key (Key A, Key B) 660.

This adjustment value can be used (either directly or modified) to inform space adjustments applied 670 within the destination media (e.g., HTML, IDML, PDF, etc.).

This process iterates across any remaining tokens 630 and data blocks 620. Once all tokens and data blocks have been processed, the document is emitted as a processed document 150.

HTML Processing

For a given HTML document containing text, the text formatting process involves parsing the HTML to isolate the user-visible content ("data") from its markup, including the hierarchical relationship of a text element to other parts of the document, if any, or how the text element should be displayed. Each section of displayable text is then processed as in "Text Processing."

In an embodiment, for a given document containing text and HTML such as 140 in FIG. 10, the text formatting process involves parsing the HTML to isolate the user-visible content ("data") 160 from its markup, including the hierarchical relationship of a text element to other parts of the document, if any, or how the text element should be displayed.

Figure 13:
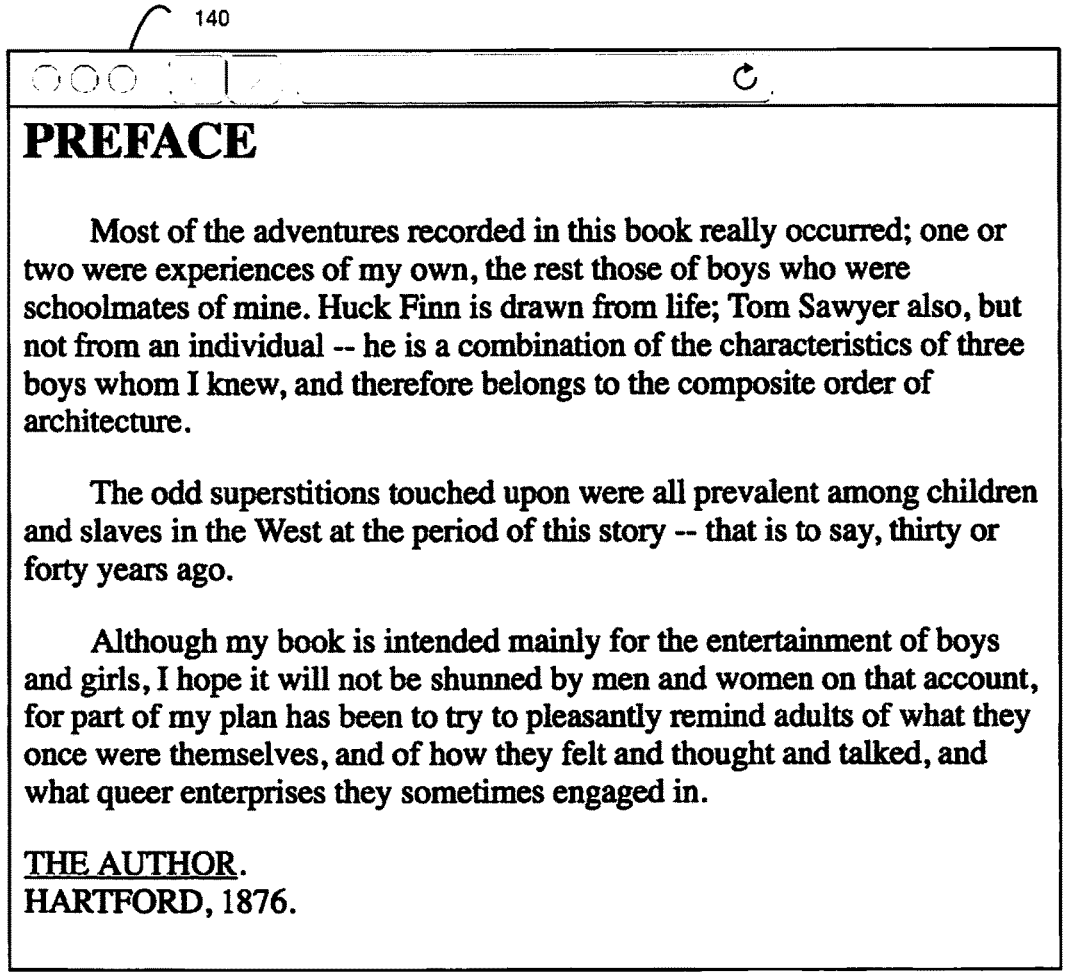
FIG. 13 is a diagram depicting a web browser rendering an English HTML document before application of a text formatting process.
Figure 14:
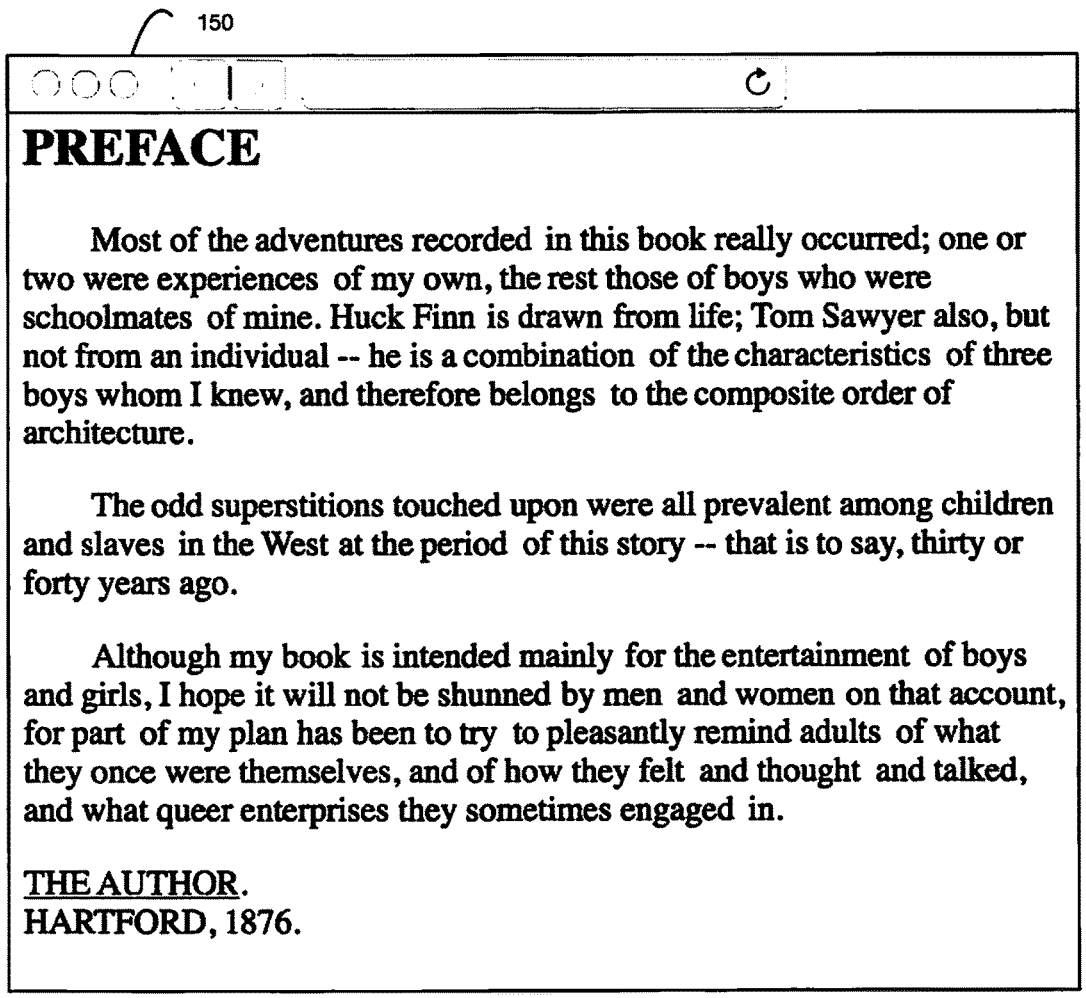
FIG. 14 is a diagram depicting a web browser rendering an English HTML document after application of a text formatting process.
Figure 16:
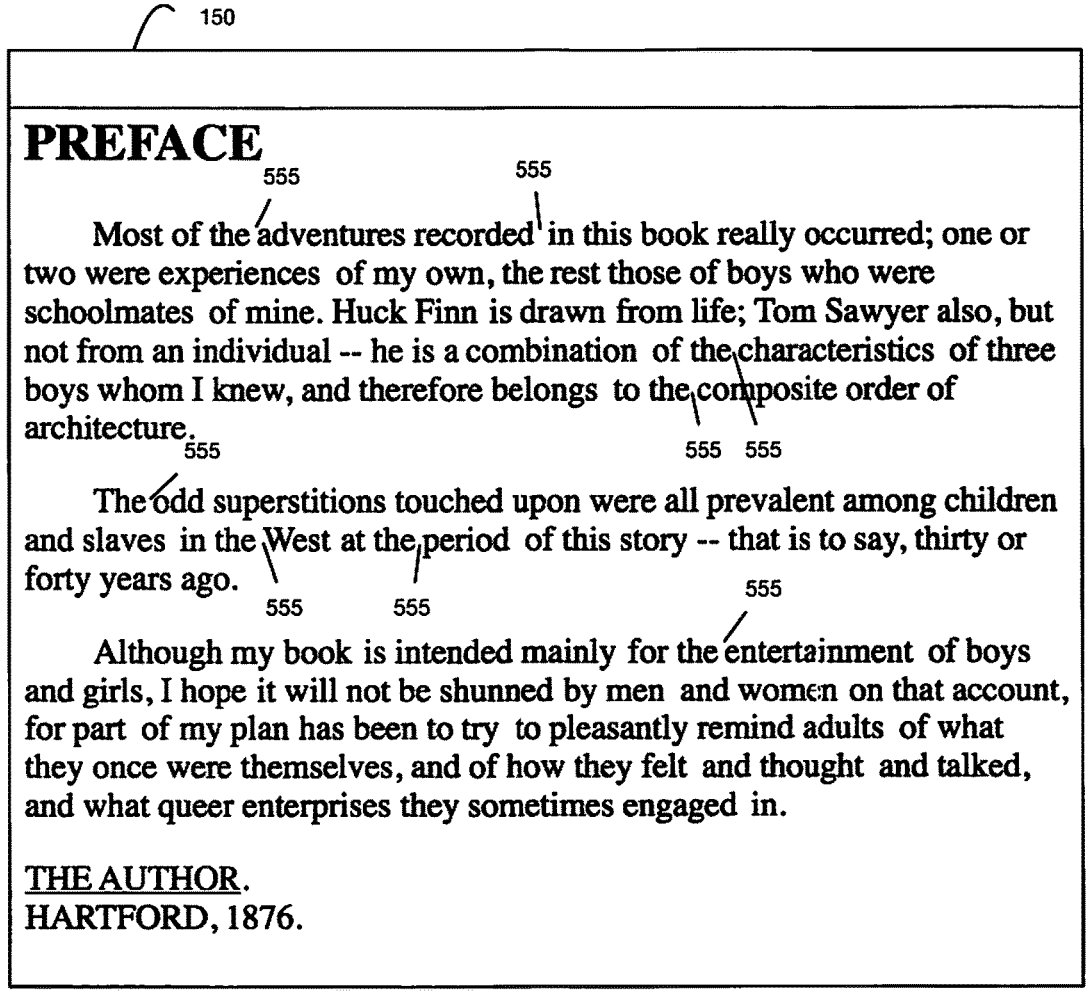
FIG. 16 is a diagram depicting a web browser rendering an English HTML document after application of a text formatting process highlighting the condensed spaces between the word "the" and a wildcard.

FIG. 10 illustrates an example input file 140 for the general method of "Text Processing" 130 shown in FIG. 9, but applied to HTML. FIGS. 11 and 12 illustrate examples of the head and body, respectively, of the HTML after being emitted as a processed document 150. FIGS. 13 and 14 illustrates a browser rendering of the user-visible content before and after spacing adjustments have been applied, respectively, to user-visible content in English. FIG. 15 illustrates a browser rendering of the user-visible content after spacing adjustments have been applied with examples of asymmetrical spacing applied to expand 550 a space indicated by the key according to the adjustment value. FIG. 16 illustrates a browser rendering of the user-visible content after spacing adjustments have been applied with examples of asymmetrical spacing applied to compress 555 a space indicated by the key according to the adjustment value. In FIG. 10-16, the text in the examples is English.

Figure 17:
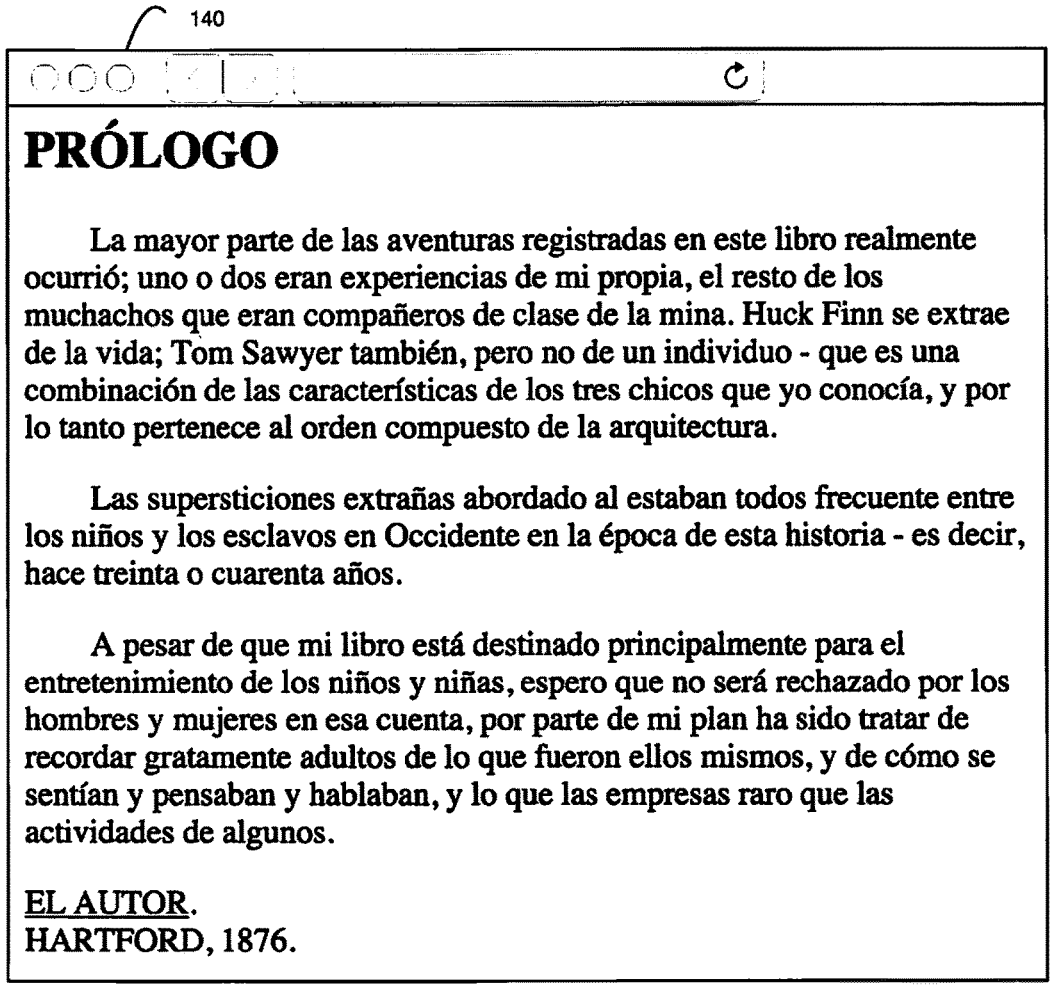
FIG. 17 is a diagram depicting a web browser rendering a Spanish HTML document before application of a text formatting process.
Figure 18:
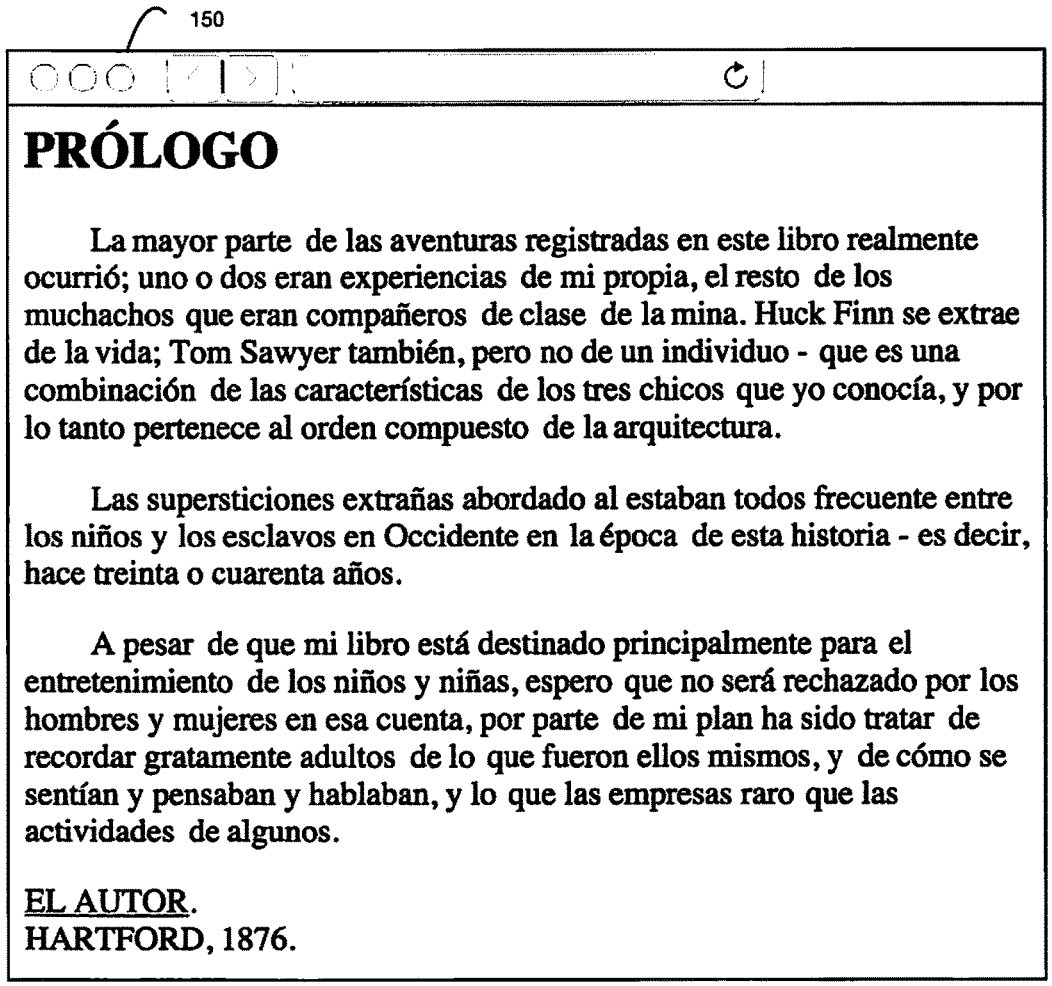
FIG. 18 is a diagram depicting a web browser rendering a Spanish HTML document after application of a text formatting process.
Figure 19:
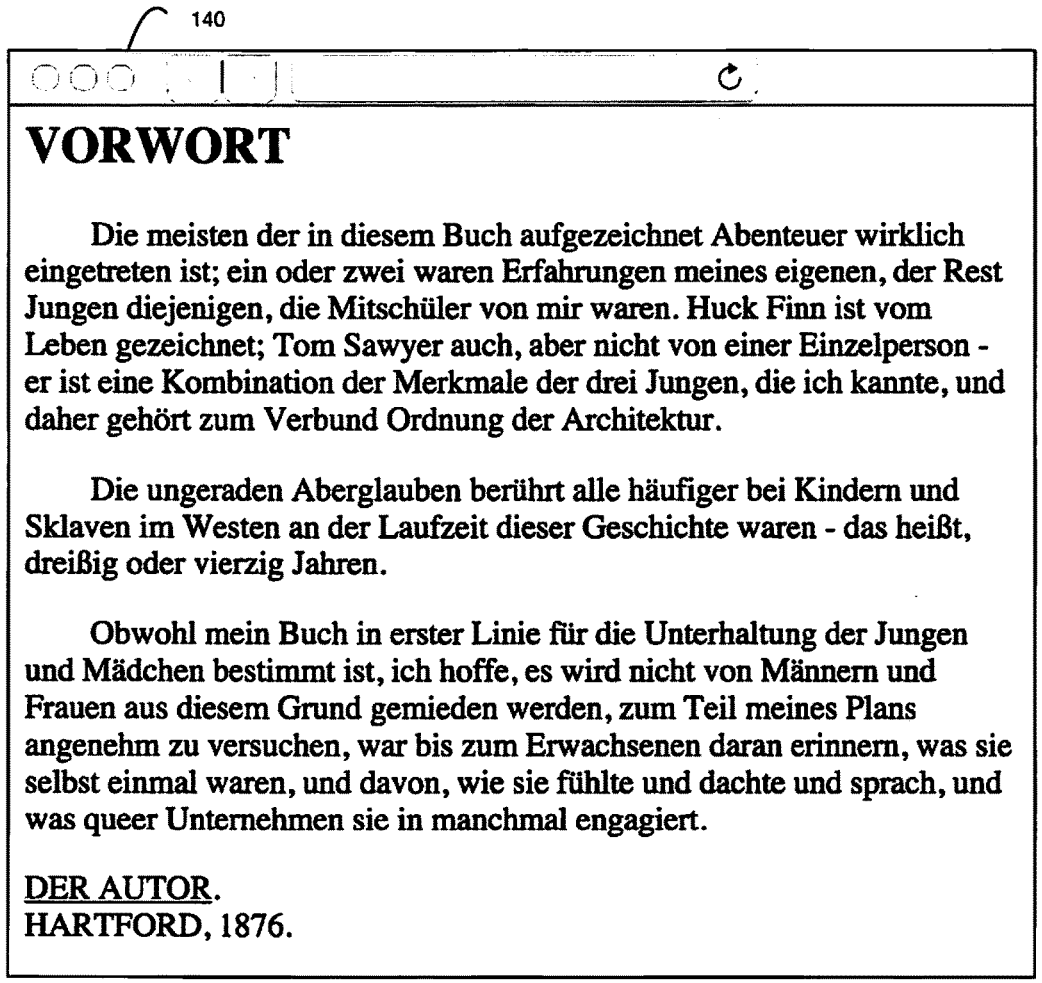
FIG. 19 is a diagram depicting a web browser rendering a German HTML document before application of a text formatting process.
Figure 20:
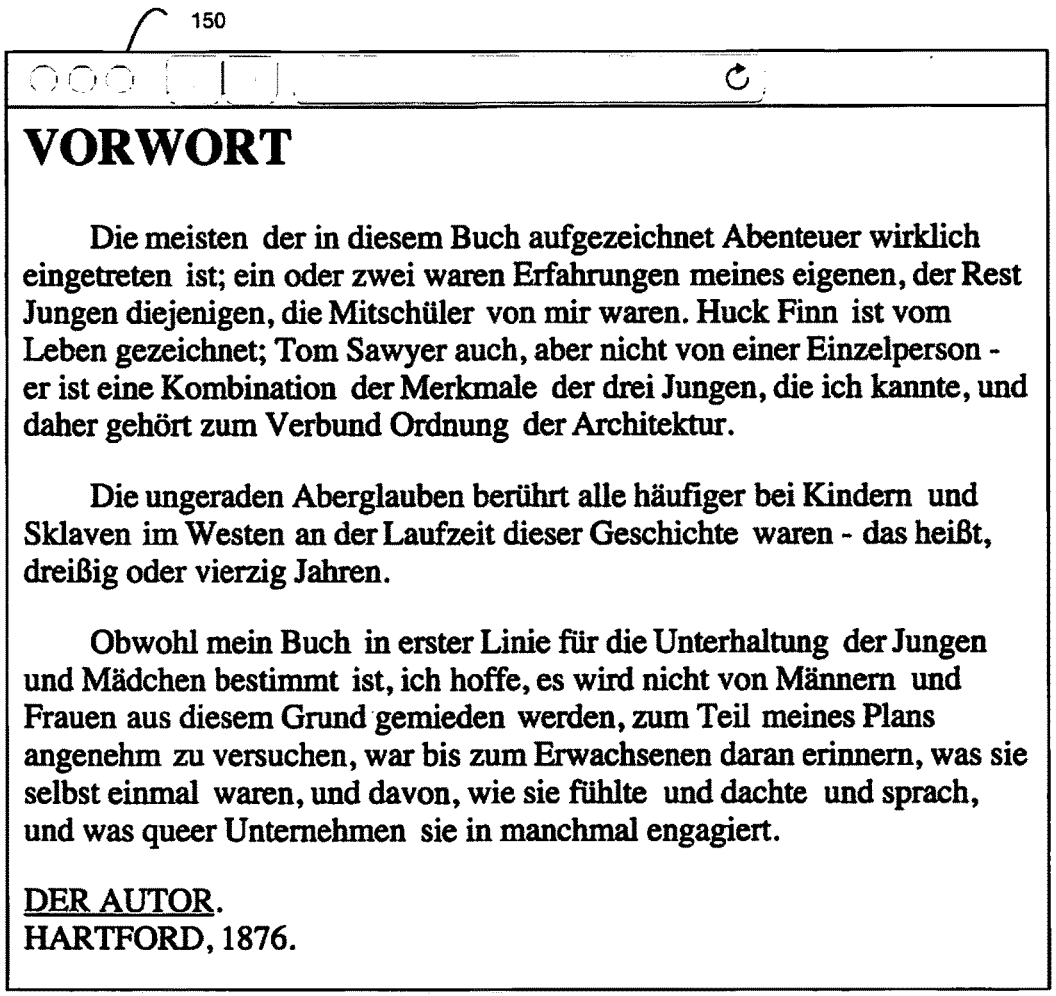
FIG. 20 is a diagram depicting a web browser rendering a German HTML document after application of a text formatting process.

FIGS. 17 and 18 illustrate a browser rendering of the user-visible content before and after spacing adjustments have been applied, respectively, to user-visible content in Spanish. FIGS. 19 and 20 illustrates a browser rendering of the user-visible content before and after spacing adjustments have been applied, respectively, to user-visible content in German.

In an embodiment, given word-space-separated keys and a corresponding adjustment value, the adjusted size of the space is in units of em. An em is a unit in the field of typography, equal to the currently specified point size. Thus, one em in a 16-point typeface is 16 points. Therefore, this unit is the same for all typefaces at a given point size. The adjusted size can be calculated using a default size (e.g., 0.25 em) multiplied by the adjustment value. For example, an adjustment value of 0.10 (+10%) and a default space size of 0.25 em would result in a space resized to 0.275 em. In a further embodiment, the process checks if it has already applied an adjustment of 0.275 em. If not, it creates a CSS specification for a new, unique SPAN class specifying the new space width and then emits the new SPAN class into a stylesheet, e.g., "adjustment1". The space between Key A and Key B is surrounded with a SPAN specification using the above-defined class. For example:

<span class="adjustment1"></span>

If the process has already applied an adjustment of a given size, then it looks up the previously-defined SPAN class (e.g., "adjustment1"). The space between Key A and Key B is surrounded with a SPAN specification using the previously-defined class, for example:

<span class="adjustment1"></span>

In a preferred embodiment, the parameter adjusted to effect the apparent size of the word space is letter-spacing. In other embodiments, other parameters including one or more of horizontal scaling, kerning, horizontal offset, padding, left-margin, or right-margin are adjusted.

In another embodiment, the previously-referenced adjustments can be applied to <SPAN> tags from generated JavaScript or fixed JavaScript with generated input, which at render-time applies adjustments to SPANs with respective id or class identifier within the Document Object Model. In another embodiment, adjustments can be implemented by inserting a static spacing structure (e.g., <IMG> and <SPACER> HTML entities) which can be placed in-line with text in order to augment or replace one or more spaces.

Arbitrary File Format Processing

Figure 21:
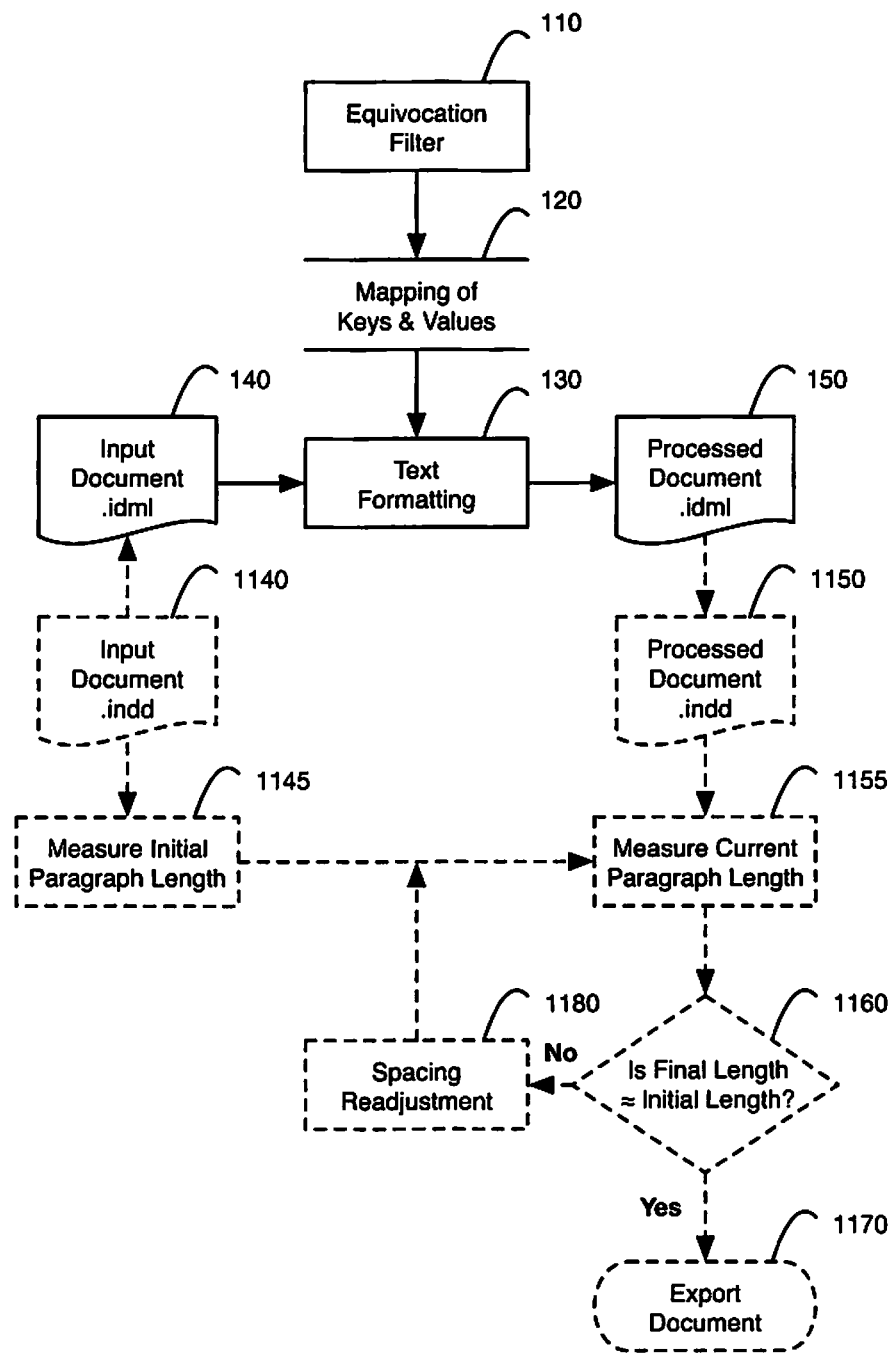
FIG. 21 is a flow chart illustrating an example method for a text formatting process using a data mapping of keys and values from an equivocation filter applied to a markup language document (.idml) and optionally correcting for any changes to paragraph length if the source of the markup language document is a desktop publishing document (.indd) destined for print.

In an embodiment, any arbitrary file format containing text, including Markup Languages (e.g., XML, HTML, XHTML, or IDML) are processed similar to the method described in "Text Processing." Text segments are extracted and processed as in "Text Processing." Spacing is adjusted within the document using the native markup language specification and the processed document (or specified subset) are created as the output. With reference to FIG. 21, an embodiment of a flowchart is illustrated for a method of text formatting process 130 applied to an InDesign Markup Language (.idml) file. An InDesign document (.indd) 1140 measures and records the initial paragraph length for each block of text 1145 and then is exported to an .idml file, a type of XML 140. This input file is processed 130 and the output file 150 is converted to a processed .indd document 1150, which is used to re-measure the current paragraph length 1155. If the current length is approximately the same as the initial length 1160 for all paragraphs then processing is complete and the document can be exported 1170 (to a PDF file). If not, the spacing can be readjusted dynamically 1180 until length parity is achieved.

Text via Server

In an embodiment, segments of text with optional font specifications are submitted to a server (local or remote), which applies the method described in "Text Processing" to the text. The format of the submitted data could be text, or encapsulated as JSON, BSON, HTML, XHTML, XML, or other encapsulation methods. Space adjustments are returned by replacing spaces with <ASYM=N> where N is the calculated adjustment from "Text Processing". In another embodiment, a database of adjustment values is returned. Each database entry corresponds to one or more spaces within the source text. In another embodiment, the logic of "Text Processing" is embedded in a browser, browser extension or application plug-in (e.g., NSAPI). Text is submitted to this embedded program instead of sent to a local or remote server.

HTML via Server

Method of "HTML Processing", where HTML is submitted with optional font specifications to a server (local or remote) which applies "HTML Processing" to the text. The format of the submitted data could be encapsulated as JSON, BSON, XHTML, XML, or other data format. In one embodiment, the HTML is returned with a <STYLE> CSS stylesheet automatically inserted into the HTML. In another embodiment, the style sheet is returned as a separate item of data. In another embodiment, the logic of "HTML Processing" is embedded in a browser, browser extension, or application plug-in (e.g., NSAPI). HTML is submitted to this embedded processor instead of being sent to a local or remote server.

Extension

In an embodiment, text is parsed and adjusted via a browser add-on or extension which implements a program which operates on the browser's Document Object Model (DOM). The extension parses the DOM of a rendered web page, extracting text that is or could be displayed for the user. The text blocks and optional per-block font specifications are then submitted as per "Text via Server."

DOM Processing

In one embodiment, the space adjustment values returned are converted into new DOM elements of a size informed by the space adjustments, which replace spaces. In another embodiment, spaces are augmented with additional DOM elements to adjust the spacing as in "HTML Processing."

HTML to Text Processing

In another embodiment, the HTML of the web page is extracted from the DOM, exported as in "HTML via Server," and re-imported into the web page, which is then refreshed to update content. In another embodiment, the HTML of the web page is extracted from the DOM, exported as in "HTML via Server." The response is then separated into plain text sections and applied directly to the content of DOM elements.

In another embodiment, displayable text segments with optional font specifications are parsed from the DOM, and submitted as in "Text via Server." The returned spacing adjustments are then applied to the DOM as in "DOM Processing."

In another embodiment, displayable text segments with optional font specifications are parsed from the DOM, and submitted as in "Text via Server." The returned HTML is then applied to the DOM as in "HTML to Text Processing" e.g., via DOM element.innerHTML.

In another embodiment, displayable text segments on a web page are broken down into unique word pairs. These word pairs are then submitted as one or more text blocks as in "Text via Server." The adjustments returned are stored in a database. The displayable text segments on the web page are re-parsed for word pairs, and any adjustments stored in the database for that word pair is applied. In another embodiment, displayable text is searched for each word pair in the database, and the spacing adjustment is applied. In another embodiment, a block of text from any source is submitted as above, generating spacing adjustments.

In another embodiment, a web browser NSAPI (or other native) plugin is used to render a web page in a browser <EMBED> tag, applying spacing as returned from "Text via Server" or HTML via Server" and displaying the text of the web page.

Applications

In one embodiment, a computer application program (or a computer application program plugin, extension, etc.) accepts outputs from one or more of the methods previously described, and creates a new document with the processed text and spaces adjusted using formatting mechanisms native to the given format. Example file formats include, but are not limited to, PDF, HTML, ePUB, IDML, INDD, DOC, and DOCX. In another embodiment, this new document is optionally rendered in memory and displayed to a user for reading. Applications of this type include web browsers, text editors, word processors, desktop publishing applications, and ebook readers.

Definitions:

"Uncertainty across a word space" is a measure of variability in a second unknown word (after the space) given a first known word (before the space).

"Filter for computing lexical uncertainties" is a process, where lexical items that have syntactic information (closed-class or function words) retain their identity; however, lexical items that lack syntactic information (open-class or content words) have their identity replaced (conflation) with one or more wildcards ("•").

"Wildcard" is a category with multiple lexical items counted as a group, for example a lexical category (auxiliary verbs, pronouns, numerals, etc.), or content words.

"Function words" are words that have little lexical meaning and express grammatical or syntactic relationships with other words in a sentence, or specify the attitude or mood of a speaker. Function words are generally sparse in meaning.

"Content words" are words such as nouns, most (but not all) verbs, adjectives, and adverbs that refer to some object, action, or characteristic. Content words are generally rich in meaning (semantic).

"N-gram frequency counts" are the number of times that an event occurs in a contiguous sequence of n items from a given sequence of text. Examples of n-grams are 1 item (unigram), 2 items (bigram), 3 items (trigram), etc.

"Pseudo-syntactic hybrids" are partial conflation hybrids that contain pseudo-syntactic information about function words and content-word transitions, and optionally between a function word and another function word. Partial conflation means that words in some word classes are conflated (combined into a category). Some words can be treated as themselves (retain their lexical identity) and are not combined into a category. Other words might be treated as a category. For example am, are, is, was, were, etc. can be treated as a lexeme (root word "to be" that contains all the inflected word forms). In another example, a lexical category ("auxiliary verb" that includes multiple lexemes such as to be, to do, and to have). Or for example, nouns such as time, some verbs such as said, adjectives such as new, and adverbs such as recently can be treated as the category "content words."

"Lexeme" is a unit of lexical meaning that exists regardless of the inflectional endings it may have or the number of words it may contain. A lexeme is a category that roughly corresponds to the set of forms taken by a single word.

"Lexical item" is a single word, a part of a word, or a chain of words that forms the basic elements of a language's lexicon (vocabulary).

"Lexical identity" is a word itself.

"Lexical category" is a word class (sometimes called a lexical class, or part of speech). Examples of common lexical categories include nouns, verbs, adjectives, adverbs, pronouns, prepositions, conjunctions, numerals, articles, and determiners.

"Closed class" is a word class which does not accept or only rarely accepts new items. Examples of closed-class categories include conjunctions, determiners, pronouns, and prepositions. In general, closed classes describe are syntactic categories that contain words that are primarily grammatical, have functional roles, and are sparse in meaning.

"Open class" is a word class that contains a large number of words and accepts the addition of new words. Examples include nouns, verbs, adjectives, adverbs, and interjections. In general, open classes are lexical categories that contain words that are primarily semantic, have content, and are rich in meaning.

"Corpus" is a collection of written texts.

"Keys and values" are elements of a key-value store, also known as a key-value database, associative array, dictionary, or hash table. Each of the keys are unique identifiers that reference and provide access to associated values. A value represents data which can either be a simple data point or complex data types like records, arrays, or dictionaries.

"Mapping input of keys and values" is a discrete set of keys and their values.

"An HTML document" is a block of text or data that contains zero or more syntactic elements as defined by the HTML standard. These documents are generally intended to be viewed within a web browser.

"An HTML tag" is code that defines the content and formatting of an HTML document. HTML tags are enclosed in '<' and '>' characters. The widths of the adjacent spaces within an HTML document can be adjusted by inserting an HTML tag.

"An XML document" is a block of text or data that contains zero or more syntactic elements as defined by the XML standard. These documents are generally intended to be viewed within a web browser. The widths of the adjacent spaces within an XML document can be marked with an XML tag that specifies the width of the space.

"An XML tag" is code that defines the content and formatting of an HTML document. XML tags are enclosed in '<' and '>' characters.

"An XHTML document" is a block of text or data that contains zero or more syntactic elements as defined by the XHTML standard. These documents are generally intended to be viewed within a web browser. The widths of the adjacent spaces within an XHTML document can be adjusted by inserting an XHTML tag.

"An XHTML tag" is code that defines the content and formatting of an XHTML document. XHTML tags are enclosed in '<' and '>' characters.

"Absolute space size" is the discrete size measurement of a given area of whitespace. An example absolute space size is 0.25.

"Relative space size" is a positive or negative adjustment in proportion to an existing absolute space size. An example relative space size would be +0.1 or −0.2, which would respectively increase by 10% or decrease by 20% the size of a space from its initial size.

"Line-to-line text density" is how compact or loose the ink is from line to line. For example, the average amount of characters or words per line of text.

"Space character" is the standard space character used in the digital representation of text to separate words and introduce whitespace in general. A space character is usually identified in the ASCII table as 32, but could also be represented as ASCII code 160 or HTML entity   (non-breaking space), or any space character as defined in the Unicode standard (including U+0020, U+00A0, U+1680, U+180E, U+2000 through U+200B inclusive, U+202F, U+205F, U+3000, U+FEFF).

"Unicode private use area space character" is a character as defined by the Unicode standard in the range of U+E000 through E+F8FF inclusive. The visual representation of characters in this range can be modified to suit any purpose, including use of a font to represent different sizes of whitespace.

"CSS stylesheet" is a block of code which utilizes elements of the CSS language to determine how visual elements should appear on a page of text or other content. The widths of the adjacent spaces within an HTML or XHTML document can be adjusted by using an HTML or XHTML tag that references one or more styles from a CSS stylesheet.

General Considerations

Figure 22:
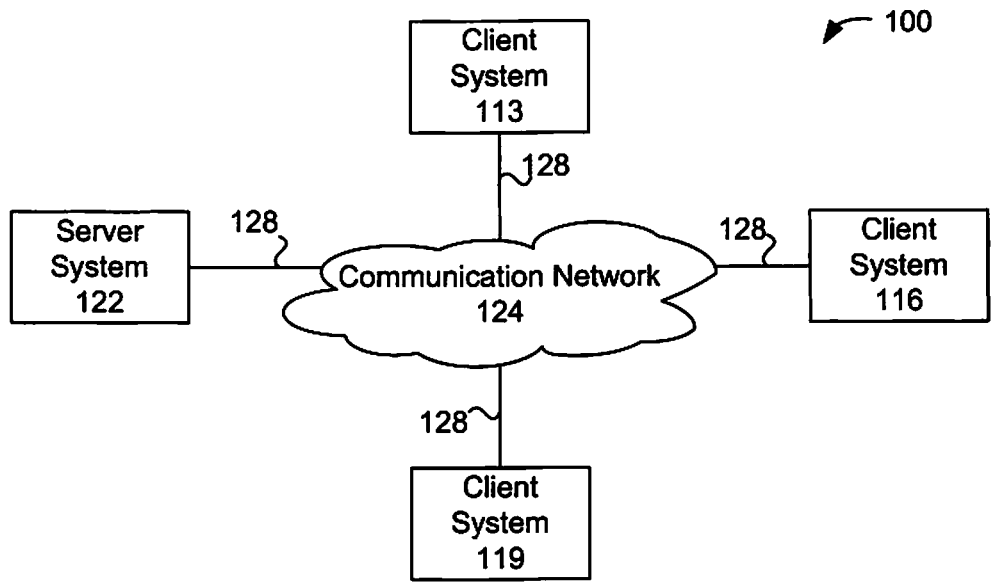
FIG. 22 shows a block diagram of a client-server system and network in which an embodiment of the system may be implemented.

FIG. 22 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 22. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 22 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

Figure 23:
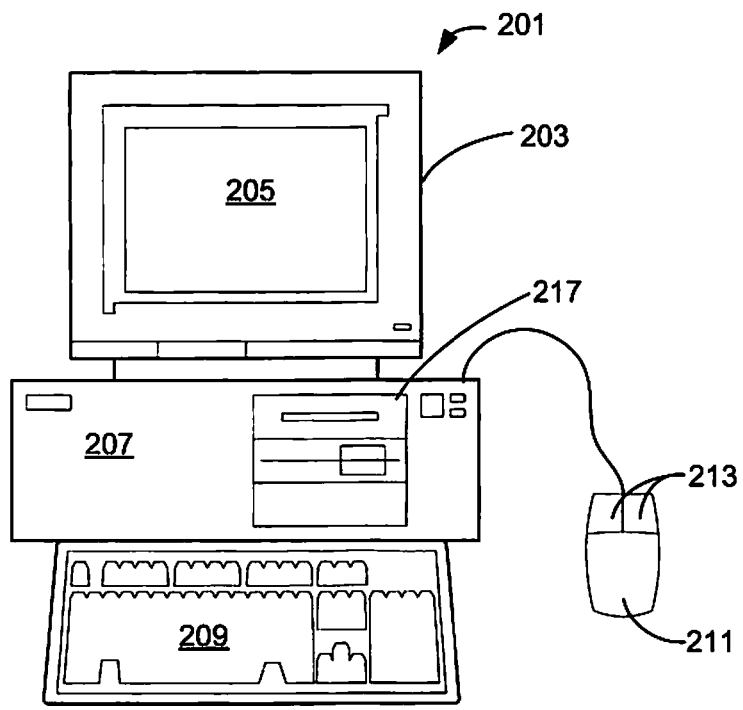
FIG. 23 shows a more detailed diagram of an example of a client or computer which may be used in an embodiment of the system.

FIG. 23 shows an exemplary client or server system. In an embodiment, a user interfaces with the system through a computer workstation system, such as shown in FIG. 23. FIG. 23 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, or through a network such as the Internet.

Figure 24:
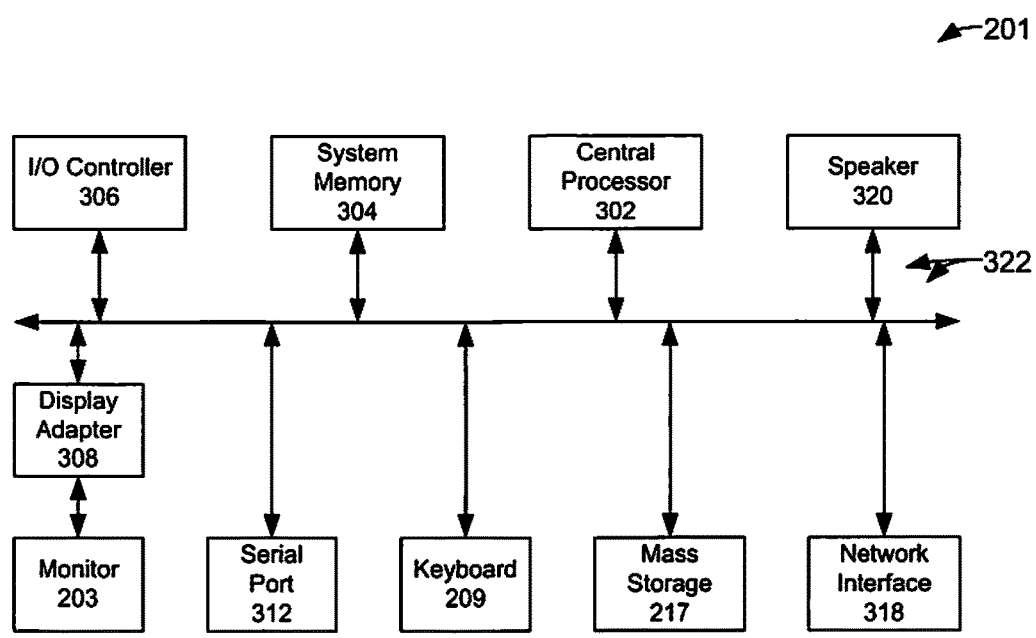
FIG. 24 shows a system block diagram of a client computer system.

FIG. 24 shows a system block diagram of computer system 201. As in FIG. 23, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 23 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for determining an uncertainty across a word space in text, comprising the steps of:
    a) providing text input;
    b) providing a database of function words that express grammatical or syntactic relationships with other words in a sentence;
    d) examining a plurality of words of the text input;
    e) identifying each of the plurality of words as one of the function words in the database or as a content word if the word being identified is not in the database;
    f) generating n-gram frequency counts for each unique pseudo-syntactic hybrid, wherein each of the unique pseudo-syntactic hybrids is an n-gram composed of at least one of the following: a lexical identity, a lexeme, a lexical category, and an open-class word;
    h) repeating steps d-f for a next plurality of words until end text input is reached; and
    g) using the n-gram frequency counts to compute the uncertainty for each of the unique pseudo-syntactic hybrids;
    h) formatting widths of the word spaces in the text based upon the uncertainty to improve a human reading experience;
    wherein the lexical identity is the word, the lexeme is the set of forms a word can take, the lexical category is a part of speech of the word, and the open-class word is a content word that lacks syntactic information.

2. The method of claim 1, wherein the text input is a document containing text.

3. The method of claim 1, wherein the text input is the n-gram frequency counts are generated from a corpus.

4. A system for determining an uncertainty across a word space in text, comprising:
    a database of function words that express grammatical or syntactic relationships with other words in a sentence;
    a counter program on a computer processor for generating frequency counts for each unique pseudo-syntactic hybrids, wherein pseudo-syntactic hybrids are composed of at least one of the following: a lexical identity, a lexeme, a lexical category, and an open-class word; and
    a filter program on the computer processor for computing lexical uncertainties across the word spaces of pseudo-syntactic hybrids using the generated frequency counts;
    wherein the lexical identity is the word, the lexeme is the set of forms a word can take, the lexical category is a part of speech of the word, and the open-class status of the lexical item is a content word that lacks syntactic information and the lexical uncertainties across the word spaces are used to format the word space in the text to improve a human reading experience.

5. The system of claim 4, wherein computing the uncertainty results in providing an input map of keys and values, each of the keys indicating at least one pseudo-syntactic hybrid, and the values indicating the uncertainties across the word spaces adjacent to the keys.

6. A method for formatting text, comprising:
    providing text input to a computer processor;
    providing a mapping input of keys and values by the computer processor, the keys each indicating at least one of the unique pseudo-syntactic hybrids, and the values indicating the uncertainties across word spaces adjacent to the keys;
    examining by the computer processor the text input to look for the keys in the mapping input; and
    formatting by the computer processor widths of the adjacent word spaces adjacent to the keys of the text input based on the outcome of the examining to improve a human reading experience, wherein the formatting of the widths of the adjacent spaces of the text input is determined by the values.

7. The method of claim 6, wherein the widths of the adjacent spaces are adjusted by changing at least one of the following character attributes of a space character, a preceding character or a following character: a letter spacing, a horizontal scaling, kerning, a horizontal offset, padding, a left-margin, or a right-margin.

8. The method of claim 6, wherein the widths of the adjacent word spaces adjacent to the keys are adjusted by inserting an HTML tag within an HTML document.

9. The method of claim 6, wherein the widths of the adjacent word spaces adjacent to the keys are adjusted by inserting an XML tag within an XML document.

10. The method of claim 6, wherein the widths of the adjacent word spaces adjacent to the keys are adjusted by inserting an XHTML tag within an XHTML document.

11. The method of claim 6, wherein one of the values from the mapping input indicates an absolute space size.

12. The method of claim 6, wherein the widths of the adjacent spaces are adjusted by replacing a space character with at least one unicode private use area space character with a specified width that matches the value from the mapping input.

13. The method of claim 6, wherein one of the values from the mapping input indicates a relative space size, which is converted to an absolute space size to be to be applied as the widths of the adjacent spaces.

14. The method of claim 13, wherein the distribution of the relative space sizes across the keys and the values of the mapping input is maintained, but an absolute space size is adjusted dynamically.

15. The method of claim 14, wherein an HTML tag is used to dynamically adjust the absolute space size.

16. The method of claim 14, wherein an HTML tag refers to a CSS stylesheet that provides the adjustment of the absolute space size that is applied by the HTML tag.

17. The method of claim 6, wherein the formatting of the widths of the adjacent spaces is adjusted by inserting one or more pixels or sub-pixels before or after space characters.

18. The method of claim 6, wherein the formatting of the width of the adjacent spaces is adjusted by a web browser or a web-browser plug-in which renders a web document.

19. The method of claim 6, wherein the keys indicate a list of one or more items which are composed of at least one of the following: a lexical identity, a lexical category, an open-class status of a lexical item and a closed-class status of the lexical item wherein the lexical identity is the word, the lexeme is the set of forms a word can take, the lexical category is a part of speech of the word, the open-class status of the lexical item is a content word that lacks syntactic information and the closed-class status of the lexical item is a class of words that does not accept new items.

20. The method of claim 19, wherein the uncertainties across the word spaces is determined by a measure of conditional entropy.

21. A computer program product for formatting text, the computer program product comprising a non-transitory computer-readable storage medium having computer-readable program code portions stored therein, the computer-readable program code portions comprising:
a first portion configured to provide a text to a computer processor;
a second portion configured to provide a mapping input of keys and values to the computer processor, each of the keys indicating at least one pseudo-syntactic hybrid, and each of the values indicating the uncertainty across a word space adjacent to the key; and
a third portion configured to execute on the computer processor to examine the text input to look for the keys in the mapping input and formatting widths of between-word spaces of the text input that is based on an outcome of the examination to improve a human reading experience, wherein the formatting of the widths of the between-word spaces is determined by the values.

22. In a computer system, having a display, and a method of displaying text, comprising the steps of:
a) creating by a computer processor a list of all instances of a word wherein the character preceding the word includes at least one of: a space, a beginning of the word, a beginning of a line, a beginning of a paragraph, a beginning of a document, a tab, an indent, or a punctuation character;
b) for each of the words in the list from step a, the computer processor looks up the word (n) and a subsequent word (n+1) that immediately follows the word (n) in an adjustment score library, wherein the word (n) and the subsequent word (n+1) are separated by a space character having an adjustment score which is stored in the adjustment score library; and
c) if found in the adjustment library, then the width of the space character is adjusted by the computer processor using the adjustment score found for a word bigram of the word and the subsequent word in the adjustment score library;
d) setting n to n+1; and
e) repeating steps b-d for all items in the list created in step a.

* * * * *